United States Patent [19]

Concannon

[11] 4,335,030

[45] Jun. 15, 1982

[54] AQUEOUS DISPERSION OF FLUOROPOLYMERS IN COMBINATION WITH EPOXY-TYPE FILM FORMERS

[75] Inventor: Thomas P. Concannon, Newtown Square, Pa.

[73] Assignee: E. I. Du Pont de Nemours and Company, Wilmington, Del.

[21] Appl. No.: 279,162

[22] Filed: Jun. 30, 1981

[51] Int. Cl.$^3$ .............................................. C08K 5/17
[52] U.S. Cl. .................................. 523/408; 523/409; 523/412; 524/916; 524/901
[58] Field of Search .................... 260/29.6 F, 29.4 UA
[56] References Cited

U.S. PATENT DOCUMENTS

| | | | |
|---|---|---|---|
| 4,039,337 | 8/1977 | Brown et al. | 106/38.28 |
| 4,076,675 | 2/1978 | Sommerfeld | 260/29.4 UA |
| 4,076,676 | 2/1978 | Sommerfeld | 260/29.4 R |
| 4,087,394 | 3/1978 | Concannon | 260/29.6 F |
| 4,247,439 | 1/1981 | Matthews et al. | 260/29.6 NR |

OTHER PUBLICATIONS

U.S. Application Serial #149,334 filed May 13, 1980 by Champaneria et al.

*Primary Examiner*—Joseph L. Schofer
*Assistant Examiner*—Bernard Lipman

[57] ABSTRACT

Aqueous dispersions of fluorocarbon polymers in combination with the water-borne reaction product of (a) carboxyl-functional polymers, (b) polyepoxides and (c) tertiary amines are provided. Such dispersions can be applied to a variety of substrates by either conventional coating techniques or electrodeposition, and provide coatings that exhibit excellent release properties and high lubricity.

31 Claims, No Drawings

AQUEOUS DISPERSION OF FLUOROPOLYMERS IN COMBINATION WITH EPOXY-TYPE FILM FORMERS

BACKGROUND OF THE INVENTION

There are many factors which militate in favor of aqueous dispersions. Among these are increased awareness of the environmental hazards associated with organic solvent vapors entering the atmosphere, the desirability of a single system that can be applied not only by the more conventional techniques of spray or roller coating but also by electrodeposition, and the economy resulting from the substitution of water for some or all of the solvents in a coating composition.

Aqueous dispersions of perfluoroolefin polymers containing film-forming materials are known, as evidenced by U.S. Pat. No. 4,087,394 issued May 2, 1978 to Concannon. The cured films obtained from such dispersions offer such advantages as excellent release properties, high lubricity, high resistance to heat and chemicals, and good electrical insulating properties.

The present invention, however, offers improvements by virtue of its utilization of a unique water-borne film former based on the reaction product of a carboxyl-functional polymer, an epoxide, and a tertiary amine.

This type of film-former is described in U.S. Pat. No. 4,247,439 issued Jan. 27, 1981 to Matthews and Sommerfeld.

SUMMARY OF THE INVENTION

According to the present invention there is provided an aqueous dispersion consisting essentially of:
(A) 90 to 10% by weight, based on the weight of (A) plus (B), of the reaction product of:
 (1) at least 50%, based on the weight of (1) plus (2), preferably at least 65%, most preferably about 78%, of an epoxy resin containing, on the average, two terminal 1,2-epoxy groups per molecule and having an epoxy equivalent weight of 750–5000, preferably about 1500–4000, most preferably about 3000;
 (2) a carboxyl-functional vinyl polymer in an amount sufficient to provide at least 2.50, preferably at least 3.50, equivalents of carboxyl groups, when the source of the carboxyl group is a monoprotic acid and at least 4.0 equivalents of carboxyl groups, when the source of such groups is a diprotic acid, per equivalent of 1,2-epoxy groups in the epoxy resin of (1), said polymer having a weight average molecular weight (determined by light scattering) of 10,000–50,000, preferably 10,000–20,000, and an acid number of 200–500, preferably about 250–350, most preferably about 300;
 (3) an aqueous solution of at least 1.50, preferably at least about 2.50, equivalents of a tertiary amine per equivalent of 1,2-epoxy groups in the epoxy resin of (1), said tertiary amine being selected from the group consisting of $R,R_2R_3N$, pyridine, N-methyl pyrrole, N-methyl piperidine, N-methyl pyrrolidine, N-methyl morpholine, and mixtures thereof and wherein R and $R_2$ are substituted or unsubstituted monovalent alkyl groups containing one or two carbon atoms in the alkyl portion and $R_3$ is a substituted or unsubstituted monovalent alkyl group containing 1–4 carbon atoms; and
 (4) 10–90% of the amount required for stoichiometric reaction with the carboxylfunctional polymer of (2), of at least one primary, secondary or tertiary amine or monofunctional quaternary ammonium hydroxide, such that the pH of the reaction product of (A) is greater than 8.5, preferably between 9 and 10;
Y being at least about $6+0.75 (2^x)$, where Y is the milliequivalent of carboxyl groups neutralized by primary, secondary or tertiary amines or monofunctional quaternary ammonium hydroxice per 100 grams of acid polymer plus epoxy, and X is the epoxy equivalent weight divided by 1000; and
 wherein for increasing ratios of carboxyl groups to 1,2-epoxy groups, the amount of amine is increased to keep the carboxyl-functional polymer water dispersible;
(B) 10–90% by weight, based on the weight of (A) and (B), of a fluorocarbon polymer which is preferably:
 (1) a polymer of a hydrocarbon monomer completely substituted with fluorine atoms or a combination of fluorine atoms and chlorine atoms;
 (2) a perfluoroolefin copolymer of tetrafluoroethylene and hexafluoropropylene;
 (3) a particulate copolymer containing
  (a) 99.5–92% tetrafluoroethylene,
  (b) 0.5–8%, preferably 3%, of at least one perfluorinated vinyl ether having the formula:

$CF_2=CF-O-R_f$ 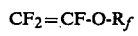

in which $R_f$ represents one or more perfluoroalkyl radicals having from 1 to 10 atoms or a particulate perfluorinated ether having the formula:

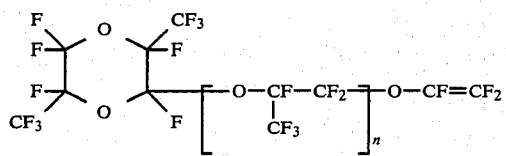

in which n is zero to four, and, optionally,
  (c) hexafluoropropylene; or
 (4) polyvinyl fluoride; or
 (5) polyvinyl difluoride; or
 (6) a fluorocarbon telomer, having a number average molecular weight of approximately 25,000, obtained by telomerizing one mole of tetrafluoroethylene in the presence of a peroxide catalyst and 0.01 to 0.6 moles of an active telogen, preferably methylcyclohexane; or
 (7) an elastomeric copolymer comprised of 70% to 30% by weight of polyvinyl difluoride and 30% to 70% by weight of hexafluoropropene;
(C) optionally, up to 20% by weight, based on the weight of (A), of an aqueous nitrogen or phenolic crosslinking agent;
 and, optionally, pigments, colorants, and stabilizers; wherein the dispersion comprises 5–50%, by weight of the dispersion, of (A) and (B), the remainder being water and an organic liquid or a mixture of organic liquids not exceeding the weight of the water in the dispersion. Additionally, articles coated or impregnated with these dispersions are provided. (Percentages, proportions and ratios herein are by weight except where indicated otherwise.)

DETAILED DESCRIPTION OF THE INVENTION

The aqueous dispersion of this invention is capable of depositing, by roller or spray coating or by electrodeposition, a wet film which, upon baking at between 100° C. and 370° C., provides a tough, continuous coating of high lubricity, chemical and heat resistance, in addition to excellent electrical insulating and release properties. A variety of substrates, such as metal or ceramics, can be coated with the dispersion of this invention. Depending upon the end use anticipated, the proportion of fluoropolymer present in the invention will vary. If a fluoropolymer-rich surface with enhanced release properties is desired, about 40–60% by weight, based on the combined weight of fluoropolymer and epoxy film-formers, of fluoropolymer is desirable. Alternatively, if mere enhancement of lubricity is desired, about 20–40% by weight of fluoropolymer is desirable.

The water-borne coating composition of the invention includes a solution or dispersion of the reaction product of an epoxy resin, a tertiary amine, and a carboxyl-functional polymer. By mixing these components in a random order and utilizing aqueous solutions of highly specific tertiary amines such as dimethyl ethanol amine, the result is a stable, water-soluble or dispersible salt of a polymeric quaternary ammonium hydroxide and a carboxyl-functional polymer. While this salt can be crosslinked without the addition of external crosslinking agents, the optional addition of an external crosslinking agent, such as an aqueous phenolic or nitrogen resin, also affords a crosslinkable solution or dispersion which is stable at room temperature. Both compositions, the salt and the solutions or dispersion containing an external crosslinking agent, are infinitely dilutable with water.

Whether the coating composition is a solution or a dispersion is largely dependent on the nature of the particular amine used, the stoichiometry of the system, and the epoxy equivalent weight. Even when the composition is opaque some of the resinous components may be dissolved, and when the composition appears to be a clear solution it is possible that small amounts of the components are in a dispersed state. For sake of simplicity, hereafter the term "dispersion" will be used to denote the water-borne coating composition.

The dispersion, with or without an external crosslinking agent, as prepared, usually has a pH of above 7. Upon drying, a hard, solvent-resistant film having excellent resistance to acids, bases, hot water, and detergent results. To obtain dispersion stability when mixed with fluoropolymer, the epoxy/amine/polymeric acid dispersion should have a minimum pH of 8.5, preferably between 9 and 10. This is because the fluoropolymer dispersions preferred for use in the invention are more stable in a basic medium. As the epoxy/amine/polymeric acid reaction product is more acidic than the fluoropolymer dispersions, the acidity of the reaction product is first neutralized with amine or a quaternary ammonium hydroxide before the addition of the basic fluoropolymer dispersion. Otherwise, the pH of the fluoropolymer dispersion is changed, leading to a destabilization characterized by the fluoropolymer being "kicked out" of dispersion.

The low molecular weight epoxy resins to be utilized in the present invention are commonly known in the art. One class of such resins is based on the condensation products of epichlorohydrin and bisphenol A. For a more detailed description of those epoxy resins that are either suitable or preferred for use in the invention, see U.S. Pat. No. 4,247,439 issued Jan. 27, 1981 to Matthews and Sommerfeld (incorporated in this description by reference).

The quantity of the epoxy resin to be utilized in the coating composition of this invention is determined in relation to the amount of carboxyl-functional polymer and the relative amounts are dependent on the end use application of the coating but there must be at least 50%, preferably in the range of 65–90%, of epoxy resin present. There must be, furthermore, at least 2.50, preferably at least 3.50 equivalents of carboxyl groups per equivalent of 1,2-epoxy groups in the epoxy resin. This minimum equivalent requirement is valid for those carboxyl-functional polymers which contain monoprotic acids derived from alpha, beta-ethylenically unsaturated acid monomers such as acrylic acid, methacrylic acid, monoesters of alkanols having 1–8 carbon atoms with diacids, such as maleic acid, itaconic acid, fumaric acid, mesaconic acid, citraconic acid and the like, and mixtures thereof. For those carboxyl-functional polymers which contain diprotic acids derived from diacids such as maleic acid, itaconic acid, fumaric acid, mesaconic acid, citraconic acid, and mixtures thereof, the minimum requirement is 4.0 equivalents, preferably at least 5.0 equivalents, of carboxyl group per 1,2-epoxy groups. Usually, no more than 10.0, and preferably no more than 6.0, equivalents of carboxyl groups, per equivalent of 1,2-epoxy groups, will be present.

The carboxyl-functional polymers utilized in this invention are prepared by conventional free radical polymerization techniques from at least one ethylenically unsaturated monomer and at least one ethylenically unsaturated acid monomer. The choice of the alpha, beta-unsaturated monomer(s) is dictated by the intended end use of the coating composition and is practically unlimited. A variety of acid monomers can be used; their selection is dependent on the desired final polymer properties.

This acid monomer can be an ethylenically unsaturated acid, monoprotic or diprotic, anhydride or monoester of a dibasic acid, which is copolymerizable with the other monomer(s) used to prepare the polymer.

The most preferred acid monomers are acrylic acid, methacrylic acid, and itaconic acid.

The acid number of the polymers suitable for this invention is 200–500, which corresponds to concentrations of about 10–77% of the acid monomers by weight of the polymer. The acid number is the number of milligrams of potassium hydroxide required to neutralize one gram of the polymer. For purposes of illustration, an acid number of 500 corresponds to 64% of acrylic acid, 76.5% of methacrylic acid, 57.5% of itaconic acid, or 51.5% of maleic or fumaric acid in the polymer. Preferred acid number values are 250–350. While acid number values of less than 200 can be suitable for preparing stable compositions of the epoxy/amine/polymeric acid, it unexpectedly appears that such low acid numbers pose stability problems in the present invention, which of course provides for addition of a fluoropolymer dispersion to the epoxy-type film-former.

Vinyl aromatic monomers are commonly utilized to be copolymerized with the acid monomers.

Illustrative of these monomers are styrene, alpha-methyl strene, vinyl toluene, and the like. The best polymers, in terms of final film properties, are those in which this type of monomer is styrene. The vinyl aromatic monomers can be present from 0–80% of the carboxyl-functional polymer, preferably from 40–80%, most preferably from 40–70%, and specifically at concentrations of about 42, 53, and 66%. For some purposes 10–45% may be preferred and, in some applications, the polymer contains no such monomer.

Other suitable monomers are esters of acrylic acid, methacrylic acid or mixtures thereof with $C_1$–$C_{16}$ alkanols. Preferred esters are the methyl, ethyl, propyl, n-butyl isobutyl, and 2-ethylhexyl esters of acrylic acid or methacrylic acid or mixtures of such esters. These esters can be present in concentrations of 0–97%, preferably 50–90% for automotive finishes and coil coatings and, for can coatings and appliance finishes, preferably 0–50%.

The polymers utilized in the water-borne coating composition of this invention have a weight average molecular weight, as determined by light scattering or, more conveniently, gel permeation chromatography, using a polystyrene standard, calibrated by light scattering methods, of about 10,000–50,000. The preferred weight average molecular weight range is 10,000–20,000. For some applications a 13,000–18,000 molecular weight is preferred. Here again, there is a difference between what is suitable for preparing the present invention and what is suitable for merely preparing a stable epoxy-type film-former. While average molecular weights for the copolymer of an aqueous epoxy film-former of the type used herein can exceed 50,000, it was unexpectedly discovered that those aqueous epoxy film-formers with such high molecular weight copolymers provide unstable dispersions of the present invention.

In order to further enhance the stability of the dispersion of the present invention, it is also desirable that the epoxy film-former have a copolymer with a high degree of functional periodicity, that is, a copolymer in which monopolymerization has been minimized. This is achieved by adding the monomers to the reaction vessel such that the more sluggishly reacting monomers are introduced first. Which monomers this may be will, of course, depend on the mix used, but in any case, will be easily ascertained by those skilled in the art.

During the preparation of the coating composition of this invention, an aqueous solution of a tertiary amine, specified below, is brought in contact with a solution of an epoxy resin in organic liquid(s) or with a solution of an epoxy resin and a carboxyl-functional polymer. A wide variety of organic liquids can be used to dissolve the epoxy resins and the carboxyl-functional polymers. Among the most commonly used solvents are alcohols. Examples of those alcohols useful in preparing the present invention are disclosed in the Matthews and Sommerfeld patent.

While the exact mode of the reaction is not fully understood, it is believed that the tertiary amine first reacts with the carboxyl-functional polymer to form the corresponding salt which, in turn, can dissociate to allow the amine to react with the 1,2-epoxy groups of the epoxy resin. It is also possible, however, that the tertiary amine reacts directly with the 1,2-epoxy groups. In either case, the resulting quaternary ammonium hydroxide can react with the carboxyl-functional polymer to yield a polymeric quaternary ammonium-amine mixed salt of a polymeric acid.

While most tertiary amines react with epoxy resins to form quaternary ammonium hydroxides, the preparation of the water-borne coating composition of this invention is carried out utilizing at least one tertiary amine selected from the group: $R_1R_2R_3N$, N-methyl pyrrolidine, N-methyl morpholine, pyridine, N-methyl pyrrole, N-methyl piperidine, and mixtures thereof, wherein $R_1$ and $R_2$ are substituted or unsubstituted monovalent alkyl groups containing one or two carbon atoms in the alkyl portion and $R_3$ is a substituted or unsubstituted monovalent alkyl group containing 1–4 carbon atoms. The Matthews and Sommerfeld patent discloses some preferred examples of $R_1R_2R_3N$. Most preferred are trimethyl amine or dimethyl ethanol amine.

The amount of tertiary amine needed in the preparation of the water-borne coating composition of this invention is determined by two factors. As a minimum, there is required at least 1.50 equivalents of tertiary amine per equivalent of 1,2-epoxy groups, preferably at least 2.5 equivalents, for the formation of stable dispersion. As the ratio of the number of carboxyl groups in the carboxyl-functional polymer to the number of 1,2-epoxy groups in the epoxy resin increases, the amount of amine is also increased to keep the carboxyl-functional polymer water dispersible. This excess amine is believed to form a salt with some or all of the excess carboxyl groups of the polymer. The excess amine, over the amount required for stoichiometric reaction with the carboxyl-functional polymer, should be such that the pH of the epoxy-type film-former (before adding the fluoropolymer) is at least 8.5, preferably between 9 and 10. The amine utilized in excess of the 1.50 equivalents of the highly specific tertiary amine per equivalent of 1,2-epoxy groups need not be the same as, nor does it necessarily have to be selected from the group of, the highly specific tertiary amines. Any primary, secondary or tertiary amine or monofunctional quaternary ammonium hydroxide can be utilized in neutralizing carboxyl groups of the carboxyl-functional polymer which are not already neutralized.

This water-borne coating composition of the invention also includes a fluorocarbon polymer, comprising 10–90% by weight of the dispersed phase of the aqueous dispersion of this invention. This fluorocarbon polymer can be of a hydrocarbon monomer completely substituted with fluorine atoms or a combination of fluorine and chlorine atoms. Typically, this polymer would be polytetrafluorethylene (PTFE). The PTFE polymers to be utilized in this invention are aqueous dispersions or dry polymers and are well known in the art. They are described in, for example, U.S. Pat. No. 2,230,654, issued Feb. 4, 1941 to R. J. Plunkett (incorporated herein by reference).

When the fluorocarbon polymer used is a copolymer of tetrafluoroethylene (TFE) and hexafluoropropylene (HFP), the TFE/HFP monomer weight ratio can be 5-95/95-5, preferably 50-95/50-5, and most preferably 93-95/7-5, 84-88/16-12, or 75-80/25-20. Representative methods of preparing such copolymers, which are either aqueous dispersions or dry polymers, are described in U.S. Pat. No. 2,946,763, issued Mar. 29, 1957 to M. I. Bro and B. W. Sandt (incorporated herein by reference).

The TFE/HFP monomer weight ratio is related to the "non-stick" properties desired in the cured films obtained from a dispersion of the invention. Those copolymers known as "low melt", that is, those having a relatively low glass transition temperature, result in a cured film in which the fluoropolymer is more concentrated at the film-air interface. This fluoropolymer-rich surface is characterized by enhanced "non-stick" properties. In contrast, the "high melt" copolymers are more uniformly distributed throughout the cured film, rather than being concentrated at the surface. Such a film may be desired where lubricity is important but there is not a need for maximum "non-stick" qualities. This process of fluoropolymer migration is discussed in more detail in U.S. Pat. No. 4,087,394 issued May 2, 1978 to Concannon (incorporated herein by reference).

Another fluoropolymer suitable for use in the present invention is a particulate copolymer of 92–99.5% tetrafluoroethylene (TFE) and 0.5–8%, preferably 3%, of a perfluorinated vinyl ether such as perfluoro(propyl vinyl ether) (PPVE). A more detailed description of such copolymers (referred to as PFA) is available in U.S. Pat. No. 4,252,859 issued Feb. 24, 1981 to Concannon and Vary (incorporated herein by reference).

Also suitable for use in the present invention are polyvinyl fluoride and polyvinyl difluoride, as well as fluorocarbon telomers or elastomeric fluoropolymers. Those particular fluorocarbon telomers (fluorotelomers) preferred are obtained by telomerizing one mole of tetrafluoroethylene in the presence of a peroxide catalyst and 0.01 to 0.6 moles of an active telogen, preferably methylcyclohexane. For details of such a reaction and the resulting telomer, see U.S. Pat. No. 3,067,262 issued Dec. 4, 1962 to Brady (incorporated herein by reference). Those elastomeric fluoropolymers (fluoroelastomers) preferred are comprised of 70% to 30% by weight of polyvinyl difluoride and 30% to 70% by weight of hexafluoropropene. For a more detailed description of such a polymer, see Canadian Pat. No. 720,545 issued Oct. 26, 1965 to Rexford.

The fluoropolymers used should have molecular weights in excess of about 20,000 (weight average, determined by melt viscosity measurements), as materials below this level tend to be waxy and unsuitable for preparing aqueous dispersions. The fluoropolymers, as prepared in aqueous media, contain particles of 0.05–15 micron diameter and have an average particle size, when used as prepared in aqueous dispersions, near 0.2 micron. The particle size is measured by electron microscopy and the diameter of a particle is taken to be the average dimension of the substantially spherical particles.

The present invention also encompasses the optional addition of pigments, colorants and stabilizers. In adding pigments, however, it was discovered that the stability of the dispersion dictates first dispersing the pigment in the acrylic portion of the epoxy acrylic-type film-former, before pigment can be added to the invention.

The aqueous dispersion of this invention can be applied by a variety of techniques and to a variety of substrates known in the industry. Roller, dip and spray coating, as well as electrodeposition, can be utilized. The details of electrodeposition are discussed in the Matthews and Sommerfeld patent cited above.

Films obtained from the aqueous dispersions of this invention can be dried and baked in a wide temperature range, up to approximately 370° C. Advantageously, the coated substrates are prebaked at approximately 150° C. for 1–30 minutes followed by baking between 200° C. and 345° C. for periods up to 30 minutes. Films so obtained from the dispersions can contain substantially completely fused polymer or partially or completely particulate fluorocarbon polymer imbedded in the film-forming material which forms a substantially continuous film.

The invention can be further understood by referring to the following examples in which parts and percentages are by weight.

Preparation of Modified Epoxy Resin Reaction Product (According to Example 3 of the Matthews and Sommerfeld patent.)

(A) Into a suitably equipped kettle, inerted with nitrogen, are added the following parts by weight:

| Monobutyl Ether of Ethylene Glycol | 91.567 |
| Normal Butanol | 32.503 |
| Ethyl Acrylate | 14.453 |
| Tertiary Butyl Perbenzoate | 0.026 |

In a separate vessel, the following are added and mixed:

| Ethyl Acrylate | 54.764 |
| Methacrylic Acid | 122.060 |
| Styrene | 72.919 |
| Normal Butanol | 2.050 |
| Tertiary Butyl Perbenzoate | 2.351 |

The reactor is heated to reflux and the monomer mixture is added evenly to the refluxing reactor over a two-hour period. Then 7.932 parts of monobutyl ether of ethylene glycol are added as a rinse for monomer feed lines. Reflux is maintained for one hour, at which point 55.500 parts of normal butanol is added. Reflux temperatures are maintained for an additional hour at which point the heat is turned off and 72.623 parts of normal butanol are added, followed by 82.312 parts of dimethyl ethanol amine and 246.940 parts of deionized water. The product is a solution of styrene/ethyl acrylate/methacrylic acid//27.6/26.2/46.2 polymer at 30.8% solids in solvent, water, and amine. The acid number of the product is 300.

(B) Into a suitably equipped kettle, inerted with nitrogen, are added the following parts by weight:

| Monobutyl Ether of Ethylene Glycol | 8.400 |
| "Epon 829" epoxy resin (Shell Chemical Co.) | 86.978 |
| Bisphenol A | 46.835 |

The kettle charge is heated to 130°–140° C., heat removed and allowed to exotherm to 175°–200° C. After the exotherm is exhausted, heat is applied and the reaction mass is maintained above 165° C. for two hours after peak exotherm. At this point, a sample can be removed for determination of completion of reaction. Theoretical epoxy equivalent weight is 3000. 6.655 parts of monobutyl ether of ethylene glycol and 26.366 parts of normal butanol are added to dilute the reaction mass and cool it to 100° C.

121.131 parts of the neutralized acrylic polymer prepared in (A) are added rapidly followed by 23.181 parts of deionized water. The mass is heated to reflux temperature and held for twenty-five minutes. Heat is turned off and 288.155 parts of deionized water, preheated to 70°–80° C., is added evenly over a one-hour period.

The resulting product contains about 77.8% epoxy resin and 22.2% acrylic resin, by weight, with an equivalent ratio of acid polymer/amine/epoxy of about 4.6/3.0/1.0. X is 3, and Y is 51.5

EXAMPLE 1

The following ingredients are mixed at room temperature:

(A) (1) Demineralized water, 3421.36 gms.;
  (2) N,N-diethyl-2-aminoethanol, 7.20 gms.; and
  (3) An aqueous dispersion of a TFE/HFP copolymer having a monomer weight ratio of 75/25 (containing 60% solids), 1200.2 gms.

(B) 2571.40 gms. of the aqueous solution of the "modified epoxy resin reaction product" (prepared as described above) is then added to 2812.5 gms. of the mixture of (A).

(C) Finally, 250.0 gms. of Union Carbide BKUA-2260 (a phenolic, heat-reactive, cross-linkable, resole-type resin [bonding resin] in the form of an aqueous dispersion which is 48% solids) is added to the mixture of (A) and (B).

The resulting dispersion can be sprayed on a metal substrate, such as an aluminum sheet, in which case it would be cured by a 15-minute pre-bake at approximately 175° C. followed by a 15-minute baking period at approximately 345° C. The cured film adheres well and also exhibits good release properties.

EXAMPLE 2

(A) The following ingredients are mixed at room temperature:
  (1) Deionized water, 3421.36 gms.;
  (2) N,N-diethyl-2-aminoethanol, 7.20 gms.; and
  (3) An aqueous dispersion of a TFE/HFP copolymer having a monomer weight ratio of 75/25 (containing 60% solids), 1200.02 gms.

(B) The 2571.40 gms. of the aqueous solution of the modified epoxy resin product (prepared as described above) are added to the mixture of (A).

The resulting dispersion can be dried and baked as in Example 1 to obtain similar results.

What is claimed is:

1. An aqueous coating composition having a dispersed phase which consists essentially of:
  (A) 90 to 10% by weight, based on the weight of (A) plus (B), of the reaction product of:
    (1) at least 50%, based on the weight of (1) plus (2), of an epoxy resin containing, on the average, two terminal 1,2-epoxy groups per molecule and having an epoxy equivalent weight of 750-5000;
    (2) a carboxyl-functional polymer in an amount sufficient to provide at least 2.50 equivalents of carboxyl groups, when the source of the carboxyl group is a mono-protic acid, and at least 4.0 equivalents of carboxyl groups, when the source of such groups is a diprotic acid, per equivalent of 1,2-epoxy groups in the epoxy resin, said polymer having a weight average molecular weight (determined by light scattering) of about 10,000-50,000 and an acid number of 200-500;
    (3) an aqueous solution of at least 1.50 equivalents of a tertiary amine per equivalent of 1,2-epoxy groups in the epoxy resin, said tertiary amine being selected from the group consisting of $R_1R_2R_3N$, pyridine, N-methylpyrrole, N-methyl piperidine, N-methyl pyrrolidine, N-methyl morpholine, and mixtures thereof and wherein $R_1$ and $R_2$ are substituted or unsubstituted monovalent alkyl groups containing one or two carbon atoms in the alkyl portion and $R_3$ is a substituted or unsubstituted monovalent alkyl group containing 1-4 carbon atoms; and
    (4) 10-90% of the amount required for stoichiometric reaction with the carboxyl-functional polymer of (2), of at least one primary, secondary or tertiary amine or monofunctional quaternary ammonium hydroxide, such that the pH of the reaction product of (A) is greater than 8.5;
    Y being at least about $6+0.75$ ($2^x$), where Y is the milliequivalent of carboxyl groups neutralized by primary, secondary or tertiary amine or monofunctional quaternary ammonium hydroxide per 100 grams of acid polymer plus epoxy, and X is the epoxy equivalent weight divided by 1000;
    and wherein for increasing ratios of carboxyl groups to 1,2-epoxy groups, the amount of amine is increased to keep the carboxyl-functional polymer water dispersible;
  (B) 10-90% by weight, based on the weight of (A) plus (B), of a fluorocarbon polymer; and
  (C) optionally, up to 20% by weight, based on the weight of (A), of a nitrogen or phenolic cross-linking agent.

2. The composition of claim 1 in which component (A) is such that (A)(1), (A)(2), (A)(3) and (A)(4) comprise about 0.1-50% by weight of (A) and the remainder of (A) is comprised of the liquid carrier which is water and, optionally, organic liquid in a volume ratio of from 70:30 to all water.

3. The composition of claim 2 wherein the carboxyl-functional polymer is present in an amount sufficient to provide at least 3.50 equivalents of carboxyl groups, when the source of the carboxyl group is a monoprotic acid, and at least 4.0 equivalents of carboxyl groups, when the source of such groups is a diprotic acid, per equivalent of 1,2-epoxy groups in the epoxy resin.

4. The composition of claim 2 wherein said carboxyl-functional polymer is present in an amount sufficient to provide no more than 6.0 equivalents of carboxyl groups per equivalent of 1,2-epoxy groups in the epoxy resin.

5. The composition of claim 2 wherein said epoxy resin has an epoxy equivalent weight of 1500-4000.

6. The composition of claim 2 wherein said carboxyl-functional polymer is a polymer of at least one $\alpha,\beta$-ethylenically unsaturated monomer and at least one $\alpha,\beta$-ethylenically unsaturated acid.

7. The composition of claim 6 wherein said $\alpha,\beta$-ethylenically unsaturated acid is selected from the group consisting of acrylic acid, methacrylic acid, and itaconic acid.

8. The composition of claim 6 wherein said carboxyl-functional polymer has an acid number of 200-250.

9. The composition of claim 6 wherein said carboxyl-functional polymer has an acid number of 250-350.

10. The composition of claim 3 wherein said carboxyl-functional polymer is present in an amount sufficient to provide 3.0-5.0 equivalents of carboxyl groups per equivalent of 1,2-epoxy groups and said tertiary amine of (C) is present in the amount of 2.75-3.5 equivalents per equivalent of 1,2-epoxy groups.

11. The composition of claim 3 wherein said carboxyl-functional polymer has the composition of styrene/alkyl (meth)acrylate/$\alpha,\beta$-ethylenically unsaturated acid//20-70/10-60/15-54.

12. The composition of claim 2 wherein the tertiary amine of (A)(3) $R_1R_2R_3N$ is selected from the group consisting of trimethyl amine, dimethyl ethanol amine, methyl diethanol amine, diethyl methyl amine, ethyl methyl ethanol amine, dimethyl benzyl amine, dimethyl propyl amine, dimethyl ethyl amine, dimethyl 3-hydroxy-1-propyl amine, dimethyl 2-hydroxy-1-propyl amine, dimethyl 1-hydroxy-2-propyl amine, and mixtures thereof.

13. The composition of claim 6 wherein the tertiary amine of (A)(3) is dimethyl ethanol amine.

14. The composition of claim 1 in which component (A) consists essentially of liquid carrier and the reaction product of:
(1) not less than 65% by weight, based on the weight of (1) plus (2), of an epoxy resin containing, on the average, two terminal 1,2-epoxy groups per molecule, and having an epoxy equivalent weight of about 1500–4000;
(2) a carboxyl-functional polymer in an amount sufficient to provide at least about 3.50 equivalents of carboxyl groups, when the source of the carboxyl group is a mono-protic acid, and at least 4.0 equivalents of carboxyl groups, when the source of such groups is a diprotic acid, per equivalent of 1,2-epoxy groups in the epoxy resin, the polymer having a weight average molecular weight (determined by light scattering) of about 10,000–80,000 and an acid number of about 250–350;
(3) an aqueous solution of at least about 2.0 equivalents of 1,2-epoxy groups in the epoxy resin, the tertiary amine being selected from the group consisting of $R_1R_2R_3N$, pyridine, N-methylpyrrole, N-methyl piperidine, N-methyl pyrrolidine, N-methyl morpholine, and mixtures thereof and wherein $R_1$ and $R_2$ are substituted or unsubstituted monovalent alkyl groups containing one or two carbon atoms in the alkyl portion and $R_3$ is a substituted or unsubstituted monovalent alkyl group containing 1–4 carbon atoms; and
(4) 10–90% of the amount required for stoichiometric reaction with the carboxyl-functional polymer of (2), of at least one primary, secondary or tertiary amine or monofunctional quaternary ammonium hydroxide, such that the pH of the entire system after mixing is between 9 and 10;
Y being at least about $6+0.75(2^x)$ where Y is the milliequivalent of carboxyl groups neutralized by primary, secondary or tertiary amines or monofunctional quaternary ammonium hydroxide per 100 grams of acid polymer plus epoxy, and X is the epoxy equivalent weight divided by 1000; and
wherein for increasing ratios of carboxyl groups to 1,2-epoxy groups, the amount of amine is increased to keep the carboxyl-functional polymer water dispersible.

15. The composition of claim 13 wherein the reaction product of component (A) includes:
(1) about 78%, based on the weight of (1) plus (2), of an epoxy resin containing, on the average, two terminal 1,2-epoxy groups per molecule and having an epoxy equivalent weight of about 3000;
(2) a carboxyl-functional polymer in an amount sufficient to provide at least about 4.6 equivalents of carboxyl groups, when the source of the carboxyl group is a mono-protic acid, and at least 4.0 equivalents of carboxyl groups, when the source of such groups is a diprotic acid, per equivalent of 1,2-epoxy groups in the epoxy resin, said polymer having a weight average molecular weight (determined by light scattering) of about 13,000–18,000 and an acid number of about 300; and
(3) an aqueous solution of at least about 3.0 equivalents of a dimethyl amino ethanol per equivalent of 1,2-epoxy groups in the epoxy resin.

16. A coating composition of claims 1, 13 or 14 wherein components (A)(1), (A)(2) and (A)(3) are capable of forming a hydrogel structure.

17. The aqueous coating compositions of claims 1, 6 or 14 in which the fluorocarbon polymer is polytetrafluoroethylene having a weight average molecular weight, determined by melt viscosity measurements, in excess of 20,000 and its particles having a minimum average dimension of 0.05 micron and a maximum average dimention of 15 microns (as measured by electron microscopy).

18. The aqueous coating composition of claims 1, 6 or 14 in which the fluorocarbon polymer is a tetrafluoroethylene/hexafluoropropylene copolymer in a comonomer weight ratio range of 5-95/95-5, having a weight average molecular weight, determined by melt viscosity measurements, in excess of 20,000 and its particles having a minimum average dimension of 0.05 micron and a maximum average dimention of 15 microns (as measured by electron microscopy).

19. The aqueous coating composition of claims 1, 6 or 14 in which the fluorocarbon polymer is a tetrafluoroethylene/hexafluoropropylene copolymer in a comonomer weight ratio range of 93-95/7-5, having a weight average molecular weight, determined by melt viscosity measurements, in excess of 20,000 and its particles having a minimum average dimension of 0.05 micron and a maximum average dimension of 15 microns (as measured by electron microscopy).

20. The aqueous coating composition of claims 1, 6 or 14 in which the fluorocarbon polymer is a tetrafluoroethylene/hexafluoropropylene copolymer in a comonomer weight ratio of 84-88/16-12, having a weight average molecular weight, determined by melt viscosity measurements, in excess of 20,000 and its particles having a minimum average dimension of 0.05 micron and a maximum average dimension of 15 microns (as measured by electron microscopy).

21. The aqueous coating composition of claims 1, 6 or 14 in which the fluorocarbon polymer is a tetrafluoroethylene/hexafluoropropylene copolymer in a comonomer weight ratio range of 75-80/25-20, having a weight average molecular weight, determined by melt viscosity measurements, in excess of 20,000 and its particles having a minimum average dimension of 0.05 micron and a maximum average dimension of 15 microns (as measured by electron microscopy).

22. The aqueous coating composition of claims 1, 6 or 14 in which the fluorocarbon polymer is a particulate copolymer containing:
(A) 99.5–92% tetrafluoroethylene;
(B) 0.5–8% of at least one perfluorinated vinyl ether having the formula:

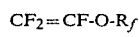

$CF_2=CF-O-R_f$.

in which $R_f$ represents one or more perfluoroalkyl radicals having from 1 to 10 atoms or a particulate perfluorinated ether having the formula:

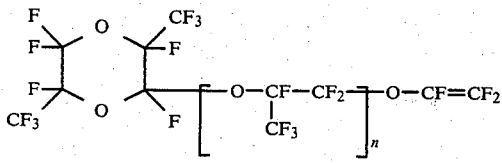

in which n is zero to four; and (C) optionally, hexafluoropropylene.

23. The aqueous coating composition of claim 22 in which the predetermined vinyl ether is perfluoro(propyl vinyl ether).

24. The aqueous coating composition of claim 23 in which the particulate copolymer contains:
 (A) 97% tetrafluoroethylene; and
 (B) 3% perfluoro(propyl vinyl ether).

25. The aqueous coating composition of claims 1, 6 or 14 in which the fluorocarbon polymer is polyvinyl fluoride having a weight average molecular weight in excess of 20,000 and its particles having a minimum average dimension of 0.05 micron and a maximum average dimension of 15 microns (as measured by electron microscopy).

26. The aqueous coating composition of claims 1, 6 or 14 in which the fluorocarbon polymer is polyvinyl difluoride having a weight average molecular weight in excess of 20,000 and its particles having a minimum average dimension of 0.05 micron and a maximum average dimension of 15 microns (as measured by electron microscopy).

27. The aqueous coating composition of claims 1, 6 or 14 in which the fluorocarbon polymer is a fluorotelomer obtained by telomerizing 1 mole of tetrafluoroethylene in the presence of a peroxide catalyst and 0.01 to 0.6 moles of methylcyclohexane, and having a weight average molecular weight in excess of 20,000 and its particles having a minimum average dimension of 0.05 micron and a maximum average dimension of 15 microns (as measured by electron microscopy).

28. The aqueous coating composition of claims 1, 6 or 14 in which the fluorocarbon polymer is a fluoroelastomer comprised of 70% to 30% by weight of polyvinyl difluoride and 30% to 70% by weight of hexafluoropropene, and having a weight average molecular weight in excess of 20,000 and its particles having a minimum average dimension of 0.05 micron and a maximum average dimension of 15 microns (as measured by electron microscopy).

29. The aqueous coating composition of claims 1, 6 or 14 in which the fluorocarbon polymer comprises 40–60%, by weight, of the dispersed phase.

30. The aqueous coating composition of claims 1, 6 or 14 in which the fluorocarbon polymer comprises 50–55%, by weight, of the dispersed phase.

31. The aqueous coating composition of claims 1, 6 or 14 in which the fluorocarbon polymer comprises 20–40, by weight, of the dispersed phase.

* * * * *